Figure 1:
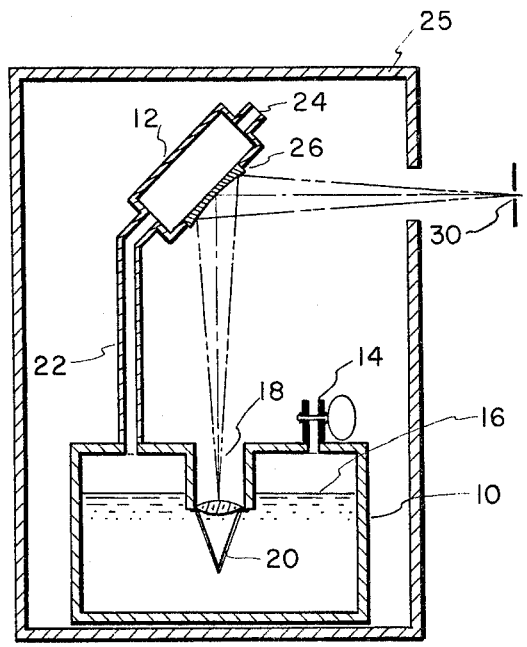

INVENTORS
MARC G. DREYFUS
HAROLD W. YATES
BY
Joseph Levinson
ATTORNEY

United States Patent Office 3,287,956
Patented Nov. 29, 1966

3,287,956
SPACE SIMULATOR
Marc G. Dreyfus and Harold W. Yates, Stamford, Conn., assignors to Barnes Engineering Company, Stamford, Conn., a corporation of Delaware
Filed Nov. 14, 1963, Ser. No. 323,655
4 Claims. (Cl. 73—1)

This invention relates to a simulator for producing radiative behavior approximating that of space, moon, or other stellar backgrounds which can be utilized for testing and calibrating instruments which are to be used in such environments.

The radiative behavior of space or stellar backgrounds is thermally similar to the radiation from a black body reference source at cryogenic temperatures. Accordingly, instruments which are to be used in such environments are tested by simulating these environments using black body reference sources which are cooled in a vacuum utilizing refrigerants such as liquid nitrogen, liquid helium, etc. In such simulation, the entrance pupil of the instrument under test is directed toward the black body reference source. To operate properly, the full field of view of the instrument must be covered by the black body. If the instrument under test has a large aperture or a wide field of view, a large black body source is required, necessitating large amounts of coolant to bring the black body to cryogenic temperatures. Since the coolant consumption rate is an important factor in determining the operating cost of the simulator, it is desirable to minimize the amount of coolant required. Minimizing the amount of coolant also permits the size of the simulator to be reduced, creating economies in the cost of making the simulator and in the cost of vacuum chambers and associated equipment used with the simulator. Of course, the coolant consumption rate determines the effective operating lifetime of a simulator with fixed coolant capacity. If less coolant is required to cool a black body reference source, a fixed capacity simulator will be able to function longer.

Accordingly, it is an object of this invention to provide an improved simulator which requires a smaller black body reference source and less refrigerant for simulating space and stellar environments.

Another object of this invention is to provide an improved simulator which is smaller in size and more economical than simulators presently available.

A further object of this invention is to provide an improved simulator in which the consumption of coolant is reduced below the levels heretofore obtainable by other known simulators.

In carrying out this invention, precooled low emissivity optical means are interposed between the instrument under test and a black body cooled to cryogenic temperatures. The cooled optical means images the full field of view of the instrument under test on the black body, such that the area of the black body need only equal the image of the aperture of the instrument under test, which considerably reduces the size of the block body, and accordingly the coolant required to cool it to cryogenic temperatures. In one illustrated form, the low-emissivity optical means, which is preferably a mirror, is precooled by the vapors of the same refrigerant used to cool the black body reference source. In another embodiment different refrigerants are utilized for cooling the black body and the mirrored surface.

Figure 2:
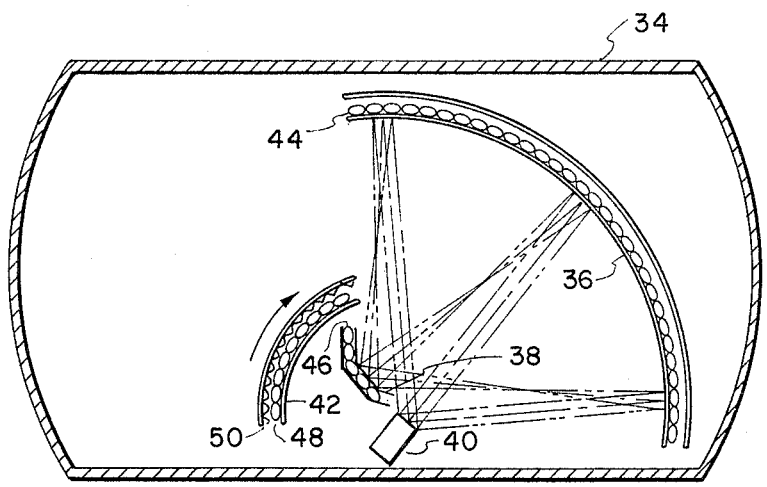

The invention, both as to its organization and method of operation, together with further objects and advantages thereof, may best be understood from the following description taken in connection with the accompanying drawings, in which:

FIG. 1 is a cross-sectional view of one form of the improved simulator embodied in this invention, and FIG. 2 is a schematic diagram of another form of the improved simulator embodied in this invention.

The means employed by the present invention for reducing the size of the black body reference source necessary to obtain the desired radiation, thus reducing the amount of coolant required to produce the same, resides in the optical means for imaging the field of view of the instrument under test on the black body reference source. Although other optical means, such as lenses, prisms, etc., may be utilized, a mirrored surface is preferred because of the absence of secondary surface reflection and greater convenience in precooling. In order for the simulator of this invention to function optimally, the low-sensitivity optics must be cooled. Taking the mirror as an example, no cooling would be required if it were perfectly reflective. Since no known mirrored surface is perfect, it will have an emissivity of low value, such as .05. This emissivity is defined as the ratio of radiation emitted by an object to the radiation that would be emitted by a black body at the same temperature. Since the mirror is in the path of the radiation from the black body, it contributes to the amount of radiation reaching the instrument under test. Since the total radiation is proportional to the emissivity and to the fourth power of temperature, the contributing radiance of the mirror can be reduced materially by cooling the mirror. If this were not done, for example, a mirrored surface having an emissivity of .05 would produce substantial interfering background radiation at about 300° K., since it would produce about three times as much radiation as would a black body at the 105° K. temperature of the lunar surface in the 15–35$\mu$ band. In such a case, without precooling of the optics, the lunar surface temperature could not be simulated. As previously pointed out, mirrors are preferred to other optical means because it is not necessary to cool them down as much as would be required with other forms of optics.

Referring now to FIG. 1, a simulator is provided having a first stage Dewar 10, and a second stage Dewar 12. The first stage Dewar 10 has a collant inlet 14 through which the Dewar 10 is filled with a collant 16. The Dewar 10 has a channel 18 therein in which is housed a black body reference source 20 which is in contact with and cooled by the coolant 16. A channel 22 provides a path for the vapors from the coolant 16 to pass into the second stage Dewar 12 which has a coolant vent 24. A large mirror 26 is mounted on the Dewar 12 such that the vapor of the coolant 16 is in contact therewith for cooling the same. The mirror 26 functions to image an entrance pupil 30 of an instrument under test on the black body 20 such that the field of view as seen by the instrument under test is focused on the black body reference source 20. The simulator is housed in a chamber 25 which is purged to prevent frosting. By utilizing a large precooled mirror in combination with a small black body reference source, less coolant will be required for cooling the black body to cryogenic temperatures, and the vapors from the coolant can be utilized for cooling the mirror. This provides for economical operation of the simulator by cutting down the size of the simulator and the coolant consumption. If space is desired to be simulated, liquid helium may be used. If a warmer enviroment, such as a lunar surface, is desired to be simulated, liquid nitrogen can be utilized. The type of coolant used will depend on the environment which is desired to be simulated, and the invention is not considered limited to any specific types of coolant.

FIG. 2 shows a wide field simulator which utilizes a plurality of coolants and which may be employed, for example, as a lunar simulator. The simulator includes a vacuum chamber 34, which houses a spherical mirror 36, a black body reference cavity 38, an instrument under test 40, and a lunar surface 42. In case of its use as a lunar simulator, the spherical mirror 36 would be cooled by liquid nitrogen run through cooling pipes 44, while the black body reference source 38 would be cooled by liquid helium through cooling pipes 46. The lunar surface 42 would be cooled by liquid nitrogen through cooling pipes 48. The lunar surface 42 would be moved into the reflected field of view of the instrument 40 by means of a circular track (not shown) concentric with the spherical mirror 36. Heating coils 50 are provided for the lunar surface in order to produce sharp gradients along the surface to simulate the terminator or crater effects on the lunar surface. As shown in FIG. 2, the field of view of the instrument 40 is imaged on the black body reference 38, which would simulate space radiation. By moving the lunar surface in the direction indicated, the lunar surface, having a space background, would thus be simulated.

The precooled spherical mirror as shown in FIG. 2 provides the very great advantage of requiring a small lunar surface for a wide field of view instrument. Without it, a larger lunar surface would be required, requiring greater cooling.

The precooled optics approach as embodied in this invention provides great advantage for testing instruments having a wide field of view. With respect to the approach as shown in FIG. 1, the coolant consumption is substantially reduced. With respect to FIG. 2, the lunar simulator is made practical by not requiring the use of an extremely large lunar surface. The optical precooling concept thus offers economy, as well as practicability in the approach of simulating space, moon and stellar backgrounds.

Since other modifications, varied to fit particular operating requirements and environments, will be apparent to those skilled in the art, the invention is not considered limited to the examples chosen for purposes of disclosure, and covers all changes and modificatons which do not constitute departures from the true spirit and scope of this invention.

What we claim as new and desire to secure by Letters Patent is:

1. A simulator for producing radiative target behavior of space, moon or stellar backgrounds which can be utilized for testing and calibrating instruments which are to be used in such environments, comprising
   (a) a relatively small black body reference source,
   (b) means for cooling said black body reference source at cryogenic temperatures,
   (c) optical means for imaging the field of view of an instrument to be tested on said black body reference source,
   (d) means for cooling said optical means whereby the emissivity and radiance of said optical means do not significantly impair the performance of the simulator which allows the use of a relatively small black body reference source requiring less cooling to attain cryogenic temperatures, and
   (e) said black body reference source, said means for cooling said black body reference source, said optical means, and said means for cooling said optical means are all enclosed in an uncooled chamber which is purged to prevent frosting therein.

2. The simulator set forth in claim 1 wherein said optical means is a mirror.

3. The simulator set forth in claim 1 wherein said means for cooling said black body reference source is a liquid coolant whose vapors comprise the means for cooling said optical means.

4. The simulator set forth in claim 3 wherein said optical means is a mirror.

References Cited by the Examiner
UNITED STATES PATENTS

| | | |
|---|---|---|
| 2,667,806 | 2/1954 | Gier et al. |
| 2,787,701 | 4/1957 | Rosin _____ 240—41.1 |
| 3,084,454 | 4/1963 | Schueller _____ 73—432 X |
| 3,187,583 | 6/1965 | Wilson et al. _____ 73—432 |

OTHER REFERENCES

Solar Radiation Simulators, Bulletin #310 C. Genarco, Inc., New York, pages 1–7, received January 17, 1963.

DAVID SCHONBERG, *Primary Examiner.*